March 5, 1968     C. B. WENDELL     3,372,001
APPARATUS FOR PRODUCING METAL OXIDES
Filed Dec. 6, 1963
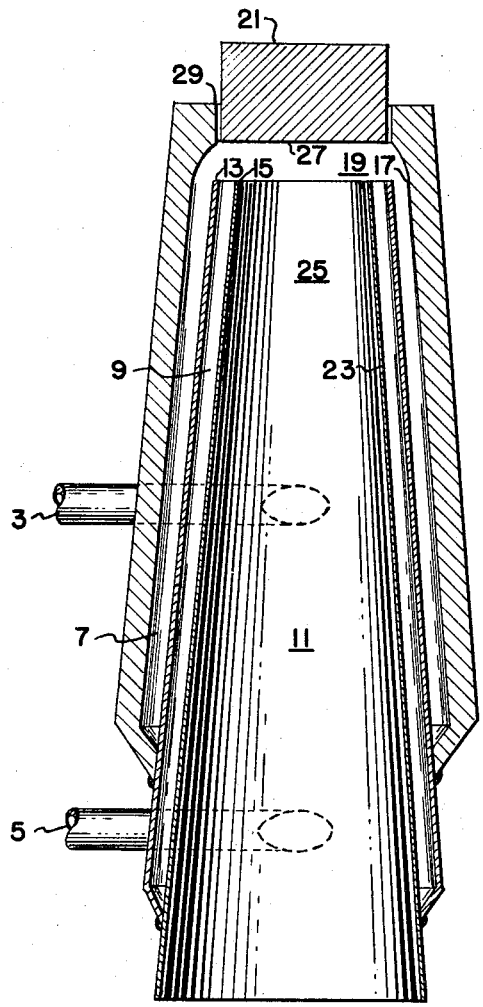
INVENTOR.
CHARLES B. WENDELL 3,372,001
APPARATUS FOR PRODUCING METAL OXIDES
Charles B. Wendell, Canton, Mass., assignor to Cabot Corporation, Boston, Mass., a corporation of Delaware
Filed Dec. 6, 1963, Ser. No. 328,693
3 Claims. (Cl. 23—277)

This invention relates to the production of pyrogenic metal oxides and in particular to improved apparatus for the production of pyrogenic metal oxides such as titanium dioxide.

Production of pyrogenic metal oxides by oxidation at elevated temperatures i.e. above about 1000° F., of a volatile metal compound such as a metal halide or oxyhalide is well known. Equation 1 below is believed to correctly illustrate the type of reaction involved when, for example, titanium tetrachloride is oxidized by a free-oxygen containing gas to produce pyrogenic titanium dioxide.

EQUATION 1

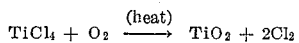
$$TiCl_4 + O_2 \xrightarrow{(heat)} TiO_2 + 2Cl_2$$

The reaction illustrated by Equation 1 is not normally sufficiently exothermic to be self-sustaining, and accordingly heat is normally supplied by any suitable means although the burning of a fuel gas, such as carbon monoxide with a free-oxygen containing gas, such as oxygen as illustrated in Equation 2 below is often preferred.

EQUATION 2

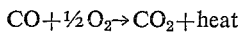
$$CO + \tfrac{1}{2}O_2 \rightarrow CO_2 + heat$$

The resulting overall reaction has been found to be generally suitable for use in the production of pyrogenic metal oxides such as titanium dioxide, zirconium dioxide, ferric oxide, silicon dioxide, stannic oxide, and the like; and particularly suitable in the production of finely-divided oxides of zirconium, iron and titanium. Details of the processes are disclosed in numerous references such as U.S. Patents 2,488,439; 2,488,440 and 2,980,509; and in "Studies on Inorganic Fillers," by Gosta Flemmert published in 1953 by Darlarnes Tiduings-Och Boktrychkeri-AB, Sweden.

Copending U.S. application Ser. No. 320,879, filed Nov. 1, 1963, by Charles B. Wendell et al., discloses an improved process for the production of pyrogenic metal oxides which comprises charging at a linear velocity of between about 75 and about 350 ft./sec., a fuel gas, a metal compound in vapor form and free-oxygen containing gas into the smaller base portion of a relatively unobstructed zone having an essentially frusto-conical configuration. Also, disclosed in said application is a preferred apparatus for effecting the above-described process which apparatus comprises a frusto-conical burner portion, at least two frusto-conical annuli positioned about and spaced from said frusto-conical burner portion, the small base portion of the outer annulus being spaced from the smaller bases of said frusto-conical burner portion and inner annulus so as to define a premixing chamber, and inlet means into said annuli to cause spiraling of gases introduced thereinto.

It has now been discovered that the stability and behavior of the flame produced within said apparatus is generally substantially affected by changes in the throughput. Thus, at low throughputs the flame tends to extend itself into the premixing chamber and excessive heating of the small base portion of the burner can occur, with concomitant danger of injury to the burner and equipment associated therewith. At high throughputs, the stability and uniformity of the flame is reduced as is normally indicated by rapid changes in flame size and geometry. In accordance with the process and apparatus of the present invention, however, variations in the position and size, etc. of the flame due to variations in throughput are readily corrected.

Accordingly, it is a principal object of the present invention to provide an improved process for the production of pyrogenic metal oxides.

It is another object of the present invention to provide improved apparatus for the production of metal oxides and in particular titanium dioxide.

Other objects of the present invention will in part be obvious and will in part appear hereinafter.

The above and other objects and advantages of the present invention will be more readily understood when reference is had to the accompanying drawing forming part hereof wherein the figure is a longitudinal schematic diagrammatic sectional view of one embodiment of the apparatus of the present invention wherein fuel gas, metal compound vapors and free-oxygen containing gas are introduced tangentially into annuli spaced about the outer surfaces of a frusto-conical reaction zone and the resulting spinning streams are premixed in a premixing chamber of controllable volume and are thereafter introduced into the smaller base portion of said frusto-conical reaction zone.

In accordance with the present invention it has been discovered that a substantially stable flame can be maintained at various throughputs in apparatus of the type preferred in said U.S. application Ser. No. 320,879 by adjusting the volume of the premixing zone.

The manner in which the volume within the premixing zone is controlled is subject to considerable variation. However, I have found a movable plug (as indicated by number 21, in the drawing) to be normally suitable. As shown in the figure, plug 21 can be fabricated as a piston and wall 29 bored through as a cylinder, the depth of protrusion of plug 21 into mixing chamber 19 (and thus the volume of said chamber) then being adjusted by any suitable external means. Obviously, any number of changes can be made in the specific apparatus described without departing from the scope of the invention. Thus, plug 21 and wall 17 can be threaded in such a manner that volume control within premixing chamber 19 can be effected by screwing plug 21 inwardly or outwardly.

It should be noted that it is important during the operation of the process or apparatus of the present invention, that the volume of premixing chamber 19 not be adjusted so that the pressure drop within throat 25 is less than the pressure drop within premixing chamber 19. Failure to maintain a greater pressure drop in throat 25 can lead to extreme flame instability.

Generally, it is found that a lower throughputs optimum volumes for the premixing chamber are lower, while at higher throughputs optimum volumes for the premixing chamber are greater. Proper premixing chamber volume for any given set of conditions can be achieved by adjusting the plug in small increments while observing the flame within, and emanating from, the frusto-conical reaction zone. Proper premixing chamber volume has been reached when (a) the geometry and size of the flame become stable, and (b) the small base portion of the apparatus does not tend to heat up substantially.

Any metal compound that is volatilizable at temperatures below about 1000° F. is generally suitable for the purposes of the present invention. Definitely preferred, however, are metal halides and oxyhalides such as titanium tetrachloride, zirconium tetraiodide, titanium tetrabromide, silicon tetrachloride, titanium oxychloride, aluminum trichloride, etc., and mixture thereof. The metal compounds can be introduced into the burner in any suitable manner such as alone, in combination with the free-oxygen containing gas, or with the fuel gases or any component thereof.

Free-oxygen containing gases (i.e. gases containing uncombined oxygen) suitable for the purposes of the present invention are generally obvious. Preferred for use in the process of the present invention, however, are dry oxygen and/or dry air. While the introduction of the free-oxygen containing gas alone is entirely suitable, said gas can, if desired, be mixed with any of the other materials being introduced into the burner and/or can also be mixed with an inert gas such as nitrogen.

Fuel gases, i.e. gases utilized in preheating and/or supplying heat to the burner which are suitable for the purposes of the present invention are generally well known. Specific examples of fuel gases that can be utilized are methane, propane, butane, carbon monoxide, sulfur chlorides, sulfur vapor and the like. Carbon monoxide, however, has generally been found to be highly preferred because it is relatively readily available and because, in producing titanium dioxide by the oxidation of titanium tetrachloride, it is generally desirable that fuel gases containing hydrogen be avoided or utilized only in limited quantities.

It is pointed out that in order to efficiently accomplish simultaneously both of the reactions illustrated by Equations 1 and 2 or their equivalents, it is normally necessary to introduce into the burner at least about sufficient free-oxygen containing gas to react stoichiometrically with the metal compound *and* the fuel gas introduced thereinto. Preferably, a small excess of free-oxygen containing gas is introduced.

In a typical run, referring to the drawing fuel gas is introduced into conduit 3 and a free-oxygen containing gas into conduit 5 (note each of said conduits terminate in an entry tangentially oriented in the same spin direction) said gases thereafter flowing helically seriatim through annuli 7 and 9 respectively, over annular rims 13 and 15 respectively, said rims being spaced from wall 17 and plug 21 which defines said mixing zone at the small base end of the cone, into premixing chamber 19 and thence through throat 25 into reaction chamber 11. The gaseous helically swirling mixture is ignited and reacts within chamber 11 preheating said chamber. Adjustable plug 21 is moved inwardly or outwardly within the confines of wall 29 in order to decrease or increase the volume of premixing-chamber 19 until the flame becomes stable. Next, in addition to the free-oxygen containing gas, vapors of a metal compound are introduced into conduit 5 and the resulting volatilized metal compound/free-oxygen containing gas mixture courses helically through annulus 9 thereby (at low throughputs) being preheated while simultaneously cooling wall 23. After passing through throat 25, the gaseous mixture reacts within chamber 11 to produce the corresponding metal oxide. Plug 21 is then readjusted as desired. The product flows out of the burner-reactor and is collected by any suitable means.

It is pointed out that, generally, the apparatus utilized should be relatively obstructionless especially in the area of the reaction zone and should be designed to allow the metal oxide product to exit therefrom with as little obstruction as possible as said product while hot tends to deposit and crystallize upon obstructions. It is also pointed out that in order to allow the reaction involved in the production of the metal oxide to proceed substantially to completion, residence time within the reaction zone should be considered.

A better understanding of the present invention can be had when reference is made to the following example which, however, is illustrative in nature and therefore is not intended to limit the scope of the present invention.

*Example 1*

To the outer annulus of a slightly preheated aluminum apparatus of the type shown in the drawing, having a 1 inch ID larger base, a ½ inch ID smaller base, a length of 3 inches, annuli 1/16 inch wide, and equipped with adjustable 21 having a diameter of 0.875 inch and previously adjusted to a clearance between plug face 27 and annular rim 15 of about 0.155 inch, there is charged carbon monoxide at a rate of about 100 s.c.f.h. Simultaneously, oxygen at a rate of about 100 s.c.f.h. is introduced into the inner annulus. The resulting mixture is ignited within chamber 11 and the reaction is allowed to continue. Next, volatilized titanium tetrachloride is introduced into the inner annulus at a rate of about 25 s.c.f.h. The reaction initiates and there is produced in the reaction zone solid titanium dioxide. It is noted that the flame is quite stable and the temperature of plug 21 remains at about 250° F.

The flow rates of the carbon monoxide, oxygen and titanium tetrachloride are then increased respectively to 400 s.c.f.h., 400 s.c.f.h. and 100 s.c.f.h. The flame loses its stability as indicated by sputtering thereof. Plug 21 is then gradualy withdrawn from mixing chamber 19 until the flame stabilizes. After ½ hour of operation under these conditions, the temperature of plug 21 is determined to be about 250° F.

Next, the flow of carbon monoxide, oxygen, titanium tetrachloride and fuel gas is reduced to 50 s.c.f.h., 50 s.c.f.h. and about 12.5 s.c.f.h respectively. The flame immediately extends itself into premixing chamber 19 the flame becomes unstable, and the temperature of the plug rises within about 1 minute to above about 2000° F. Plug 21 is then gradually inserted into chamber 19 until the geometry of the flame becomes substantially stable. The temperature of plug 21 after 15 minutes of operation at these conditions is determined to be about 310° F.

The materials from which the improved apparatus of the present invention can be fabricated are subject to considerable variation. Generally, any ceramic composition, metal or metal alloy which is substantially inert to the temperatures, reactants and products of reaction and is capable of withstanding the thermal shock is suitable. Specific examples of materials that are generally suitable for the fabrication of the apparatus of the present invention are nickel, aluminum, stainless steel, glass, vitreous silica, and the like. It should be noted that, generally, when different materials are to be used in the fabrication of plug 21 and wall 29 it is important that the coefficients of expansion of said materials be fully taken into account in order that (under the temperatures that can be encountered in operation) plug 21 remains movable within wall 29.

When maximum cooling of the burner and preheating of the oxygen and/or metal compound vapors is desired, it is obviously preferable that at least wall 23 be constructed from a substance having good heat transfer characteristics (i.e. usually a metal) in order that at low throughputs rapid heat transfer can be effected between chamber 12 and the gases flowing within the inner annulus. Moreover, it should be borne in mind that although ceramic materials are often satisfactory, ceramic materials often possess relatively low resistance to thermal shock, a factor often encountered in processes directed towards pyrogenic metal oxide production wherein flame temperatures above about 3000° F. are not unusual.

Obviously, many changes can be made in the above example, description and drawing without departing from the scope of the invention. For instance, it is entirely suitable that the free-oxygen containing gas, the metal compound, and fuel gas(es) be conveyed separately into the preliminary chamber through separate annuli. Moreover, other fuel gases can be used either in combination or separately although it should be borne in mind that the use of hydrogen containing fuel gases is not generally desirable where pigment grade titanium dioxide is the product to be produced.

In those cases wherein cooling of the apparatus becomes desirable it is obvious that the walls and/or small base of the apparatus can be cooled by any suitable means such as by means of an external water jacket.

When it is desirable that the reactants entering the burner be diluted without greatly disturbing the mass flow rates of the gases, said reactants can be diluted with an inert gas, such as nitrogen or helium prior to or during the charging of said reactants to the burner. Thus, it is possible to retain a given mass flow rate while reducing the flow of oxygen containing gas, metal compound and/or fuel gases.

Also, although for the purposes of clarity and brevity no mention was made in the above example or description of nucleating agents, it is well known in the art that it is often desirable to "seed" a metal oxide producing reaction zone with a nucleating agent, such as, for instance, in the production of titanium dioxide, aluminum trichloride. Additives which are generally added to the burner in minor amounts i.e. additives which comprises less than about 10% by volume of the total gas flow, can obviously be added to the flame tangentially, or as part of a spinning mixture, or, if desired, axially.

Accordingly, it is intended that the disclosure be regarded as illustrative and as in no way limiting the scope of the invention.

What I claim is:

1. An improved burner comprising a laterally enclosed, internally unobstructed frusto-conical main chamber, at least two concentric frusto-conical shells positioned about and uniformly spaced from the lateral walls of said frusto-conical chamber so as to form at least two concentric annuli around said chamber along the major portion of its length beginning at the small end thereof, the space between the inner shell and the chamber being closed at the large end of said inner shell and the space between the two shells being closed at the larger end of the outer shell, while the small end of the outer shell extends beyond the small ends of both the inner shell and said chamber and then terminates in a full end closure thus defining a confined premixing space communicating directly with the small ends of the main chamber and both annuli, inlet means into each of said annuli to cause spiraling of gases introduced thereinto and means for readily adjusting the volume of said confined premixing space.

2. The burner of claim 1 wherein said means for adjusting the volume of said premixing space is provided by constructing said full end closure in the form of an axially adjustable solid plug.

3. The burner of claim 1 wherein said means for adjusting the volume of said premixing space is provided by a circular plug means extending through said full end closure at the small end of said outer shell, said plug having a diameter greater than the diameter of the small end of said frusto-conical main chamber.

References Cited

UNITED STATES PATENTS

| | | | |
|---|---|---|---|
| 2,445,691 | 7/1948 | Pechukas | 23—202 |
| 2,576,228 | 11/1951 | Kinnaird | 23—277 |
| 2,822,411 | 2/1958 | Braconier et al. | 23—277 X |
| 2,823,982 | 2/1958 | Saladin et al. | 23—202 |
| 2,848,305 | 8/1958 | Lehrer et al. | 23—277 |
| 2,890,929 | 6/1959 | Rummert | 23—1 |
| 2,935,840 | 5/1960 | Schoppe | 23—182 |
| 3,021,195 | 2/1962 | Podschus et al. | 23—182 X |
| 3,054,831 | 9/1962 | Samples et al. | 23—277 X |
| 3,069,282 | 12/1962 | Allen. | |
| 3,086,851 | 4/1963 | Wagner | 23—182 X |
| 3,140,155 | 7/1964 | Cull et al. | 23—277 |

JAMES H. TAYMAN, JR., *Primary Examiner.*

EDWARD STERN, *Examiner.*